(12) United States Patent
Ujino

(10) Patent No.: US 7,317,396 B2
(45) Date of Patent: Jan. 8, 2008

(54) OPTICAL DISC HAVING RFID TAG, OPTICAL DISC APPARATUS, AND SYSTEM FOR PREVENTING UNAUTHORIZED COPYING

(75) Inventor: Masanori Ujino, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 174 days.

(21) Appl. No.: 11/137,489

(22) Filed: May 26, 2005

(65) Prior Publication Data

US 2005/0270964 A1 Dec. 8, 2005

(30) Foreign Application Priority Data

| May 26, 2004 | (JP) | ............................. 2004-156705 |
| Jun. 2, 2004 | (JP) | ............................. 2004-164730 |

(51) Int. Cl.
*G08B 13/14* (2006.01)

(52) U.S. Cl. .............................. 340/572.1; 340/572.7; 340/572.8; 340/10.1; 340/10.51; 369/53.21; 380/201; 380/203; 705/57; 726/26

(58) Field of Classification Search ............ 340/572.1, 340/572.5, 572.7, 572.8, 10.1, 10.51; 380/201, 380/202, 203; 705/51, 57; 713/169; 726/26, 726/27; 369/53.21, 53.41
See application file for complete search history.

(56) References Cited

U.S. PATENT DOCUMENTS 6,005,940 A * 12/1999 Kulinets ..................... 705/51
7,017,190 B2 * 3/2006 Weber ......................... 726/27
7,038,985 B2 * 5/2006 Ryal .......................... 369/53.21

FOREIGN PATENT DOCUMENTS

| JP | 11-250494 A | 9/1999 |
| JP | 2001-110135 A | 4/2001 |
| JP | 2002-330395 | 11/2002 |
| JP | 2002-352511 | 12/2002 |
| JP | 2002-373029 | 12/2002 |
| JP | 2003-187524 | 7/2003 |

OTHER PUBLICATIONS

Japanese Office Action dated Apr. 19, 2007 with English translation (Four (4) pages).

* cited by examiner

*Primary Examiner*—Davetta W. Goins
(74) *Attorney, Agent, or Firm*—Crowell & Moring LLP

(57) ABSTRACT

In an optical disc having an RFID tag, disc control information needed for control of reproduction of the content recorded in the disc body of the optical disc is stored in the RFID tag. Thereby, even if the content recorded in the disc body is illegally copied in some way, common optical disc apparatus incapable of reading RFID tags cannot read and copy the disc control information stored in the RFID tag. Accordingly, unauthorized copying of the content recorded on the optical disc can be reliably prevented without the use of special cryptographic technology.

1 Claim, 6 Drawing Sheets

UNAUTHORIZED COPYING PREVENTION SYSTEM 20

UNAUTHORIZED COPYING PREVENTION SYSTEM 20

OPTICAL DISC HAVING RFID TAG, OPTICAL DISC APPARATUS, AND SYSTEM FOR PREVENTING UNAUTHORIZED COPYING

BACKGROUND OF THE INVENTION

1. Field of the Invention

The present invention relates to the technology for preventing unauthorized copying of the contents recorded on optical discs such as a digital versatile disc (DVD), a compact disc (CD), and the like.

2. Description of the Related Art

Recently, as CDs and DVDs have been rapidly developed, huge amounts of music software, video software, and computer software, and the like have become widely available as the contents of such optical discs. This has raised concerns about unauthorized copying of the contents. Thus, copy protection by e.g. encrypting the contents on the media has been proactively employed as a measure to protect copyrights.

In conventional optical discs such as CDs, DVDs, or the like, disc control information needed for reproduction of the contents of the discs is recorded on the discs themselves along with the contents of the discs. Even if content information recorded on the discs is encrypted, it can be extracted as encrypted content information. Consequently, if a decryption key is cracked, the contents may be easily decrypted.

Meanwhile, contactless IC cards employing noncontact communication technology have been recently put to practical use. Such a contactless IC card uses e.g. a radio frequency identification (RFID, which is a noncontact automatic identification technology by a radio frequency) chip for storage of data associated with the card. Including the contactless IC card using the RFID chip, RFID tags, which are microminiature, allow data recorded therein to be read in a noncontact manner, and are configured to work without a battery, are expected to be increasingly utilized in the future.

To take advantage of the features of the RFID tag that it is microminiature, allows recorded data to be read in a noncontact manner, and works without a battery, it has been proposed to combine the RFID tag with an optical disc such as a CD or a DVD so as to prevent unauthorized copying of the content of the optical disc. For example, Japanese laid-open patent publication 2003-187524 discloses a system in which an RFID chip is embedded in an area on a digital recording medium such as a CD or a DVD where the content, which is encrypted, of the medium is not recorded, and the encrypted content in the content recording area is decrypted by using a decryption key recorded in the RFID chip for reproduction. Japanese laid-open patent publication 2002-373029 discloses a method of preventing unauthorized copying of software for use in a personal computer. The method includes: embedding, in an optical disc containing encrypted software, an RFID tag containing a decryption key for decrypting the encrypted software; and decrypting the encrypted software with the decryption key recorded in the RFID tag at the time of installation of the software.

However, the method of preventing unauthorized copying of the contents recorded on optical discs with the use of cryptographic technology as described above has the following problem. As computers become faster and more sophisticated with technological advances, a possibility may arise that the encryption is cracked. Consequently, the conventional method cannot reliably prevent unauthorized copying of the contents recorded on optical discs.

Further, as one of services to be provided to users with the content recorded in the optical disc as described above, it is known to provide a "bonus content" (a content added to basic contents, e.g., a piece of music that is arranged and not played in a typical concert) that is recorded in a "bonus track". Users that are allowed to view or listen to the bonus content should be limited to those having legally purchased the optical disc on which the bonus content is recorded.

SUMMARY OF THE INVENTION

An object of the present invention is to provide an optical disc with an RFID tag, an optical disc apparatus, and an unauthorized copying prevention system that are capable of reliably preventing unauthorized copying of the content recorded on the optical disc without the use of special cryptographic technology. Another object of the present invention is to provide an optical disc with an RFID tag and an optical disc apparatus that allow only a user having legally purchased an optical disc where a bonus content is recorded to view or listen to the bonus content.

A first aspect of the present invention provides an optical disc comprising an RFID tag, wherein the RFID tag stores disc control information needed for control of reproduction of a content recorded in a disc body of the optical disc.

In the above configuration, the disc control information needed for control of reproduction of the content recorded in the disc body is stored not in the disc body itself but in the RFID tag. Thereby, even if the content recorded in the disc body is illegally copied in some way, common optical disc apparatus incapable of reading RFID tags cannot read and copy the disc control information stored in the RFID tag. As a result, the content recorded in the optical disc that is a copy cannot be reproduced. Accordingly, unauthorized copying of the content recorded on the optical disc can be reliably prevented without the use of special cryptographic technology.

Preferably, the optical disc comprising the RFID tag further comprises an antenna for the RFID tag.

In one example, the RFID tag is disposed on a surface (hereinafter, referred to as a label surface) of the disc body of the optical disc that is opposite to a surface of the disc body to be subjected to a laser beam.

For example, the RFID tag is stuck on the label surface.

Preferably, the RFID tag is disposed on a clamping area in the disc body of the optical disc, the content being not recorded in the clamping area.

For example, the RFID tag is stuck on the clamping area.

In another example, the RFID tag is embedded in a substrate provided in the disc body of the optical disc.

A second aspect of the present invention provides an optical disc comprising an RFID tag, wherein the RFID tag stores part of disc control information needed for control of reproduction of a plurality of contents recorded in a disc body of the optical disc, and said part of the disc control information is needed for control of reproduction of part of the plurality of contents.

In the above configuration, disc control information needed for control of reproduction of a bonus content can be stored in the RFID tag, whereby viewing/listening to the bonus content can be restricted to a user having legally purchased the optical disc, which has the RFID tag, where the bonus content is recorded.

Preferably, the part of the disc control information is disc control information needed for control of reproduction of a bonus content.

A third aspect of the present invention provides an optical disc comprising an RFID tag, wherein the RFID tag stores key information needed for reproduction of an additional content other than contents that are capable of being reproduced by an optical disc apparatus not having a reader for the RFID tag.

The above configuration allows viewing/listening to the additional content (e.g. a bonus content) to be restricted to a user having legally purchased the optical disc having the RFID tag in which the key information needed for reproduction of the additional content is stored.

A fourth aspect of the present invention provides an optical disc apparatus comprising: an optical pickup that reads a content recorded in a disc body of an optical disc; a reader that reads disc control information stored in an RFID tag disposed at the disc body of the optical disc; reproduction means for reproducing the content read by the optical pickup; and a microprocessor that controls the reproduction of the content by the reproduction means based on the disc control information read from the RFID tag by the reader.

A fifth aspect of the present invention provides an optical disc apparatus comprising: an optical pickup that reads disc control information (hereinafter, referred to as disc body side disc control information) recorded in a disc body of an optical disc and a plurality of contents recorded in the disc body of the optical disc; a reader that reads disc control information (hereinafter, referred to as RFID tag side disc control information) stored in an RFID tag disposed on the disc body of the optical disc; reproduction means for reproducing the contents read by the optical pickup; and a microprocessor that controls reproduction of the contents by the reproduction means based on the disc body side disc control information and the RFID tag side disc control information.

A sixth aspect of the present invention provides an optical disc apparatus comprising: an optical pickup that reads contents recorded in a disc body of a first optical disc; a reader that reads key information stored in an RFID tag disposed on a disc body of a second optical disc; reproduction means for reproducing the contents read by the optical pickup; and a microprocessor that determines whether or not to allow reproduction of an additional content other than contents that are capable of being reproduced by an optical disc apparatus not having the reader, based on the key information read by the reader from the RFID tag on the second optical disc.

Preferably, a plurality of RFID tags are used to store the key information; and the microprocessor generates new key information based on the key information read from the plurality of RFID tags, and determines whether or not to allow reproduction of the additional content based on the new key information A seventh aspect of the present invention provides a system for preventing unauthorized coping, comprising an optical disc having an RFID tag and an optical disc apparatus.

The RFID tag stores disc control information needed for control of reproduction of a content recorded in a disc body of the optical disc.

The optical disc apparatus includes: a reader that reads the disc control information stored in the RFID tag; an optical pickup that reads the content recorded in the disc body of the optical disc; reproduction means for reproducing the content read by the optical pickup; and a microprocessor that controls the reproduction of the content by the reproduction means based on the disc control information read from the RFID tag by the reader.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
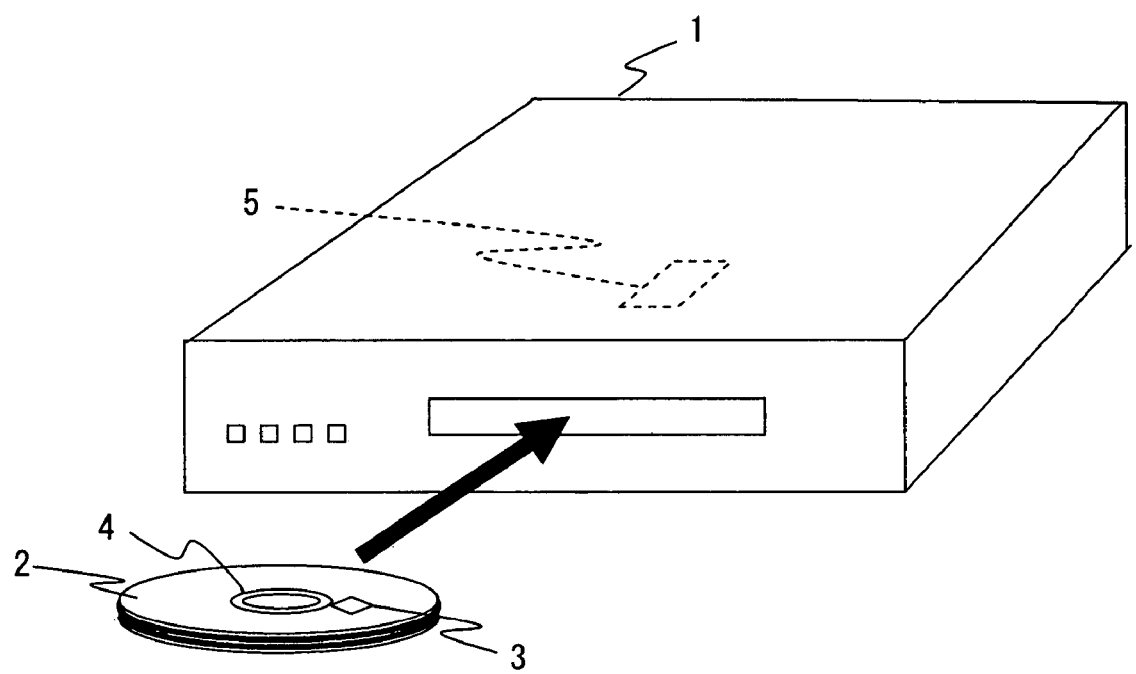
FIG. 1 is an external view of an optical disc having an RFID tag and an optical disc apparatus having a reader for RFID tags according to a first embodiment of the present invention.

Referring now to the accompanying drawings, the preferred embodiments of the present invention are described. FIG. 1 shows an unauthorized copying prevention system 20. The system 20 includes an optical disc 2 having an RFID tag 3 according to a first embodiment of the present invention, and an optical disc apparatus 1 equipped with an RFID tag reader 5. The first embodiment corresponds mainly to claims 1 to 12, 16, and 20. The optical disc apparatus 1 has an RFID tag reader 5 (claimed reader) therein. An RFID tag 3 and an antenna 4 are stuck on a surface of the optical disc 2. The antenna 4 is formed in a circular shape on the surface of the optical disc and connected to the RFID tag 3.

Figure 2:
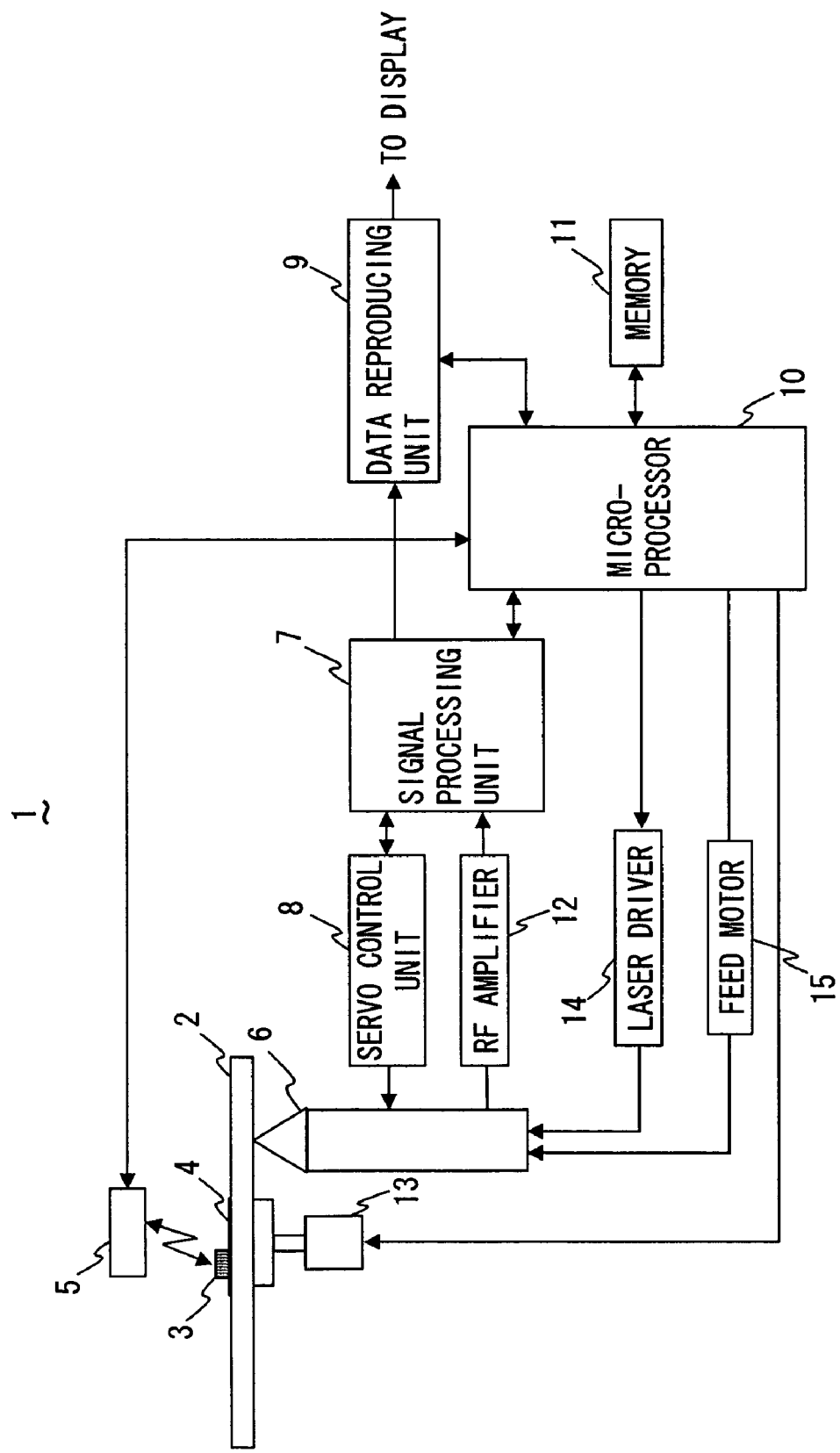
FIG. 2 is an electrical block diagram of the optical disc apparatus.

FIG. 2 is an electrical block diagram of the optical disc apparatus 1. When the optical disc 2 having the RFID tag 3 is inserted into the optical disc apparatus 1, the RFID tag reader 5 reads disc control information stored in the RFID tag 3 on the optical disc 2 via radio communication. In order to provide enhanced sensitivity in transmission/reception of radio signals, an antenna (not shown) in the RFID tag reader 5 is arranged so as to be parallel to the surface of the optical disc 2 and to have the center on the central axis of the optical disc 2 spatially. The disc control information read by the RFID tag reader 5 is sent from the RFID tag reader 5 to a microprocessor 10. A signal processing unit 7 generates focus control signals and tracking control signals based on RF signals from an optical pickup 6 that is amplified by an RF amplifier 12 so as to control a servo control unit 8. A data reproducing unit 9 (reproduction means) is a decoder for reproducing video data and audio data from the RF signals.

The microprocessor 10 controls reproduction of the content of the disc by the data reproducing unit 9 based on the disc control information read by the RFID tag reader 5. Besides the above described functions, the microprocessor 10 controls a spindle motor 13, a feed motor 15, a laser driver 14, the signal processing unit 7, the servo control unit 8, the data reproducing unit 9, a memory 11 that stores information needed for the control, and other components of the apparatus.

Figure 3A:
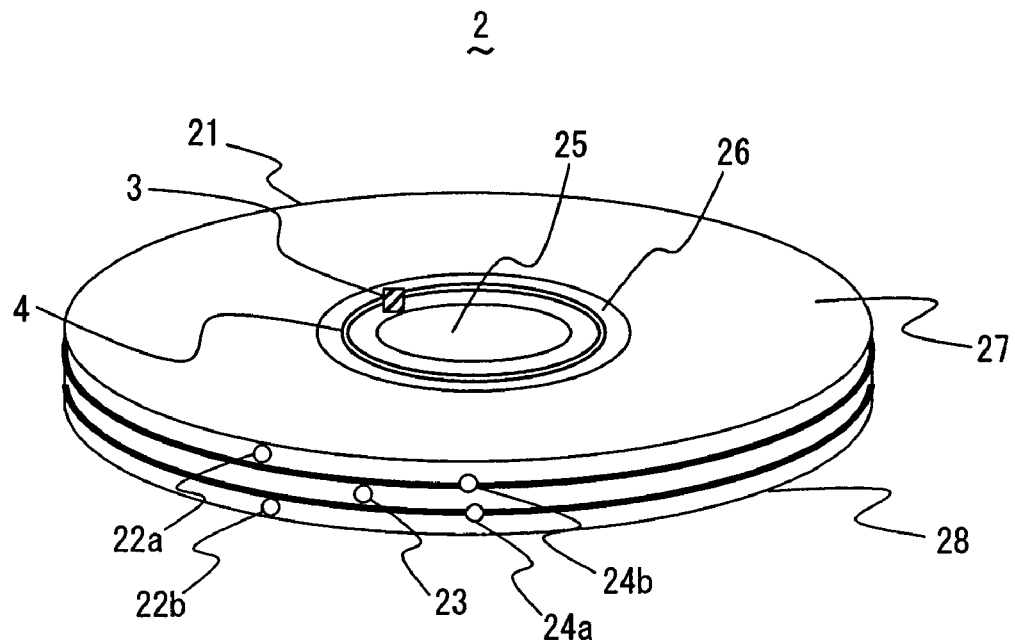
FIG. 3A is a perspective view of an optical disc having an RFID tag.
Figure 3B:
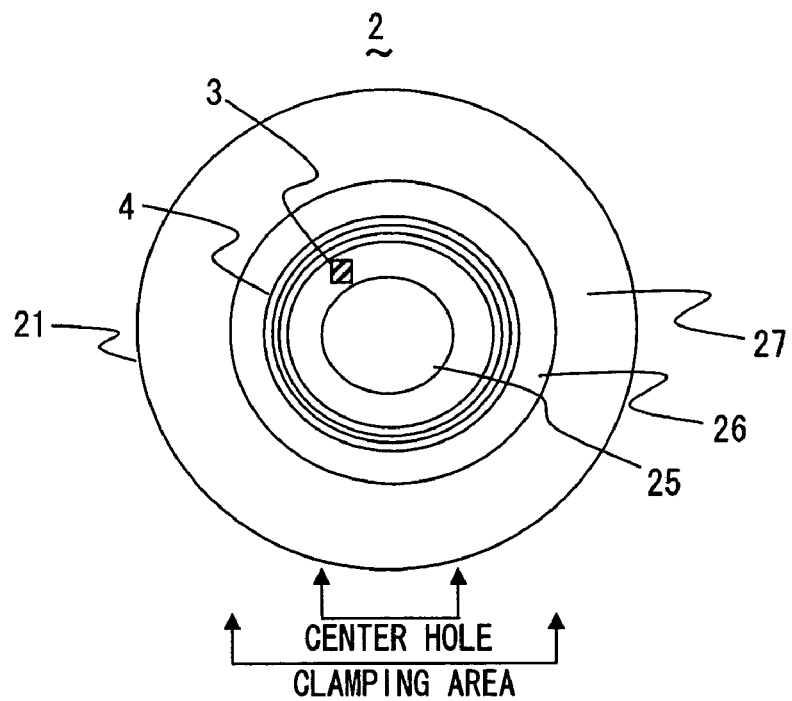
FIG. 3B is a plan view of the optical disc having the RFID tag.

FIGS. 3A and 3B show a disc body 21, the RFID tag 3, and the antenna 4 of the optical disc 2 for illustrating the relationship thereof. Referring to FIG. 3A, the disc body 21 of the optical disc 2 is configured to be a two-layer disc. More particularly, the disc body 21 includes two substrates 22a and 22b provided on both sides of the disc body 21, two recording layers 24a and 24b, and a space layer 23 sandwiched between the two recording layers 24a and 24b. Further, the optical disc 2 has a center hole 25 formed at the center of the disc body 21 and a clamping area 26 that is included in the disc body 21 and that is not to be used for recording of data. The RFID tag 3 is disposed on the clamping area 26 in FIGS. 3A and 3B, but it can be disposed on anywhere within a label surface 27 that is opposite to a recording surface 28 to be subjected to a laser beam. In FIGS. 3A and 3B, the antenna 4 is disposed on the clamping area 26, but it can be also disposed on anywhere within the label surface 27. The antenna 4 and the RFID tag 3 are electrically connected to each other so that the RFID tag 3 can transmit and receive data via the antenna 4. It is to be noted that, in FIGS. 3A and 3B, the RFID tag 3 and the antenna 4 are disposed on the label surface 27 but they can be embedded in the disc body 21, e.g., in the substrate 22a.

FIG. 3B is a plan view of the optical disc 2 shown in FIG. 3A. It is to be noted that the antenna 4 may be formed by printing a metal on the surface of the optical disc 2 for example. The antenna 4 is formed in a circle with its center at the center of the disc, whereby, even when the optical disc 2 rotates, radio waves are radiated in the same direction along the central axis of the disc. The antenna (not shown) in the RFID tag reader 5 is arranged on the central axis of the optical disc 2. Thereby, at the time of transmission/reception of data stored in the RFID tag 3, stable transmission/reception can be achieved with reduced fluctuation in radio waves.

Figure 4A:
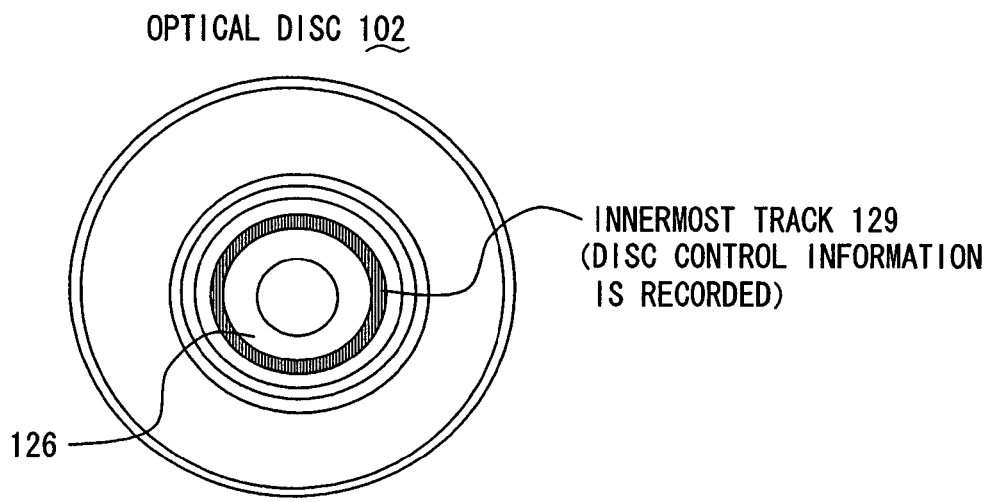
FIG. 4A illustrates where disc control information is stored in a conventional optical disc.
Figure 4B:
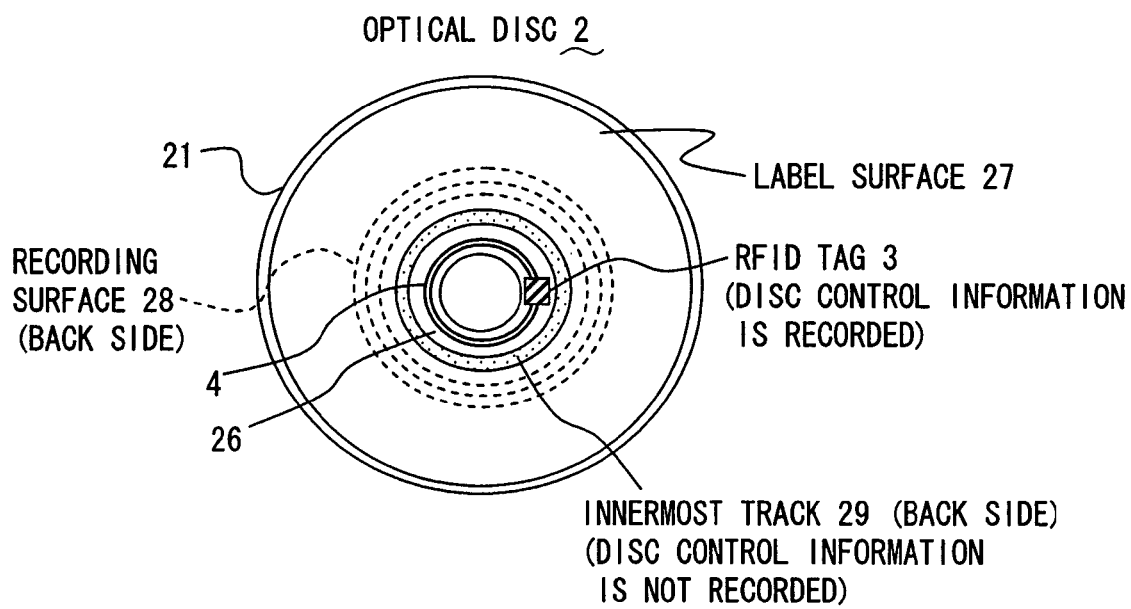
FIG. 4B illustrates where disc control information is stored in the optical disc according to the first embodiment of the present invention.

Referring now to FIGS. 4A and 4B, description will be made as to the relationship between the RFID tag 3, in which the disc control information is stored, and the disc body 21 in the optical disc 2 having the RFID tag 3. FIG. 4A shows a conventional optical disc 102, wherein disc control information needed for control of reproduction of the content of the disc is recorded on an innermost track 129 (hatched area in FIG. 4A) of the disc. A conventional optical disc apparatus first reads the disc control information recorded on the innermost track 129 and then reproduces the content based on the read disc control information. In other words, the disc control information is necessary for reproduction of the content.

FIG. 4B shows the optical disc 2 with the RFID tag 3 according to the first embodiment of the present invention, wherein disc control information needed for control of reproduction of the content of the disc is not recorded on an innermost track 29 (dotted area in FIG. 4B, in which the track surface is opposite to the paper surface) of the optical disc 2. The disc control information is stored only in the RFID tag 3. Thus, even if a conventional optical disc apparatus without a reader for RFID tags tries to reproduce the content recorded in the disc body 21 of the optical disc 2 having the RFID tag 3 according to the first embodiment, the conventional apparatus can never reproduce the content because the disc body 21 of the optical disc 2 does not contain the disc control information.

As described above, in the optical disc 2 having the RFID tag 3 and the optical disc apparatus 1 equipped with the RFID tag reader 5 according to the first embodiment, the disc control information is recorded not on the disc body 21 but in the RFID tag 3 so that the disc control information is read by the RFID tag reader 5 intended for RFID tags. In this configuration, even if the content recorded in the disc body 21 is illegally copied in some way, the illegally copied content can be prohibited from reproduction because the disc control information, which is stored in the RFID tag 3, is protected against coping. Accordingly, unauthorized copying of the content recorded on the optical disc 2 can be reliably prevented without the use of special cryptographic technology.

Figure 5:
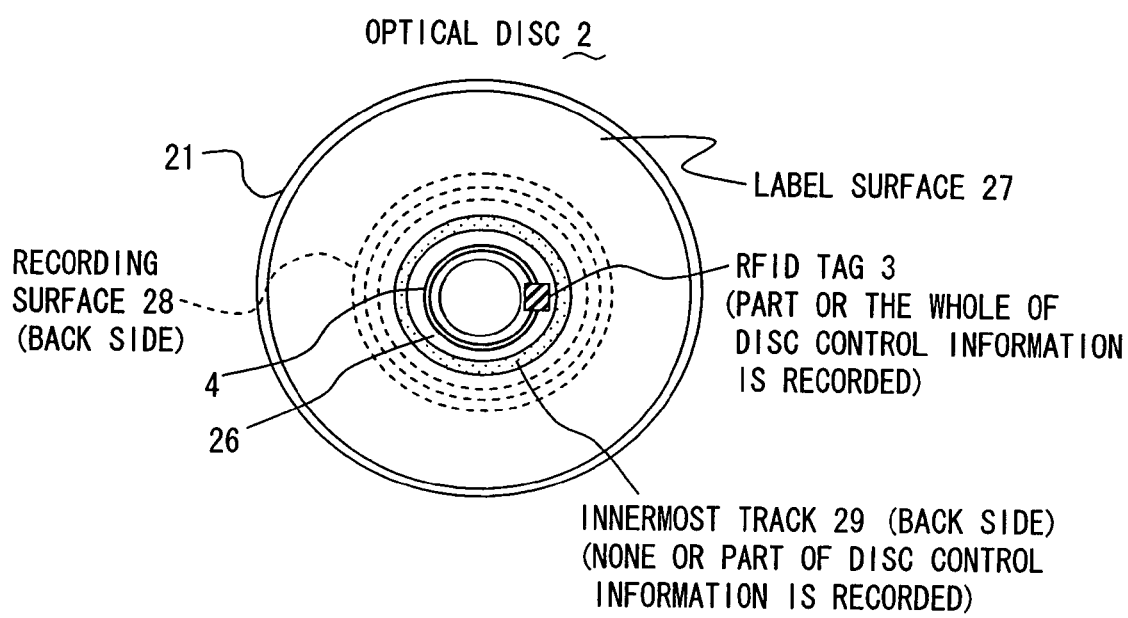
FIG. 5 illustrates where disc control information is stored in an optical disc having an RFID tag according to a second embodiment of the present invention.

FIG. 5 shows an optical disc 2 having an RFID tag 3 according to a second embodiment of the present invention. The second embodiment corresponds mainly to claims 13, 14, and 17. In this embodiment, a plurality kinds of contents are recorded on the optical disc 2. As shown in FIG. 5, part or the whole of disc control information, which is needed for control of reproduction of part or all of the plurality kinds of contents, is stored in the RFID tag 3 rather than in an innermost track 29 (dotted area in FIG. 5, in which the track surface is opposite to the paper surface) of the optical disc 2.

In the optical disc 2 described above, for example, disc control information needed for control of reproduction of a bonus content (a content added to basic contents, e.g., a piece of music that is arranged and not played in a typical concert) is stored in the RFID tag 3 while disc control information needed for control of reproduction of the basic contents (the contents other than the bonus content) is recorded in the innermost track 29 of the optical disc 2. The disc control information stored in the RFID tag 3 corresponds to RFID tag side disc control information in claim 17, and the disc control information recorded in the innermost track 29 of the optical disc 2 corresponds to disc body side disc control information in claim 17.

If it is possible to read the disc control information needed for control of reproduction of the bonus content from the RFID tag 3, the microprocessor 10 can control reproduction of the contents in the optical disc 2 based on both the disc control information read from the tag and the disc control information read from the innermost track 29 of the optical disc 2. Thereby, all of the contents in the optical disc 2 can be reproduced. On the other hand, in the case where a user has illegally copied the contents recorded in the disc body 21 of the optical disc 2 having the RFID tag 3, it is impossible for the microprocessor 10 of the optical disc apparatus 1 to obtain the disc control information needed for control of reproduction of the bonus content from the optical disc that is a copy. As a result, the bonus content in the optical disc 2 cannot be reproduced although only the basic contents can be reproduced. In other words, only a user having legally purchased the optical disc 2, which has the RFID tag 3, where the bonus content is recorded is allowed to view or listen to the bonus content.

Figure 6:
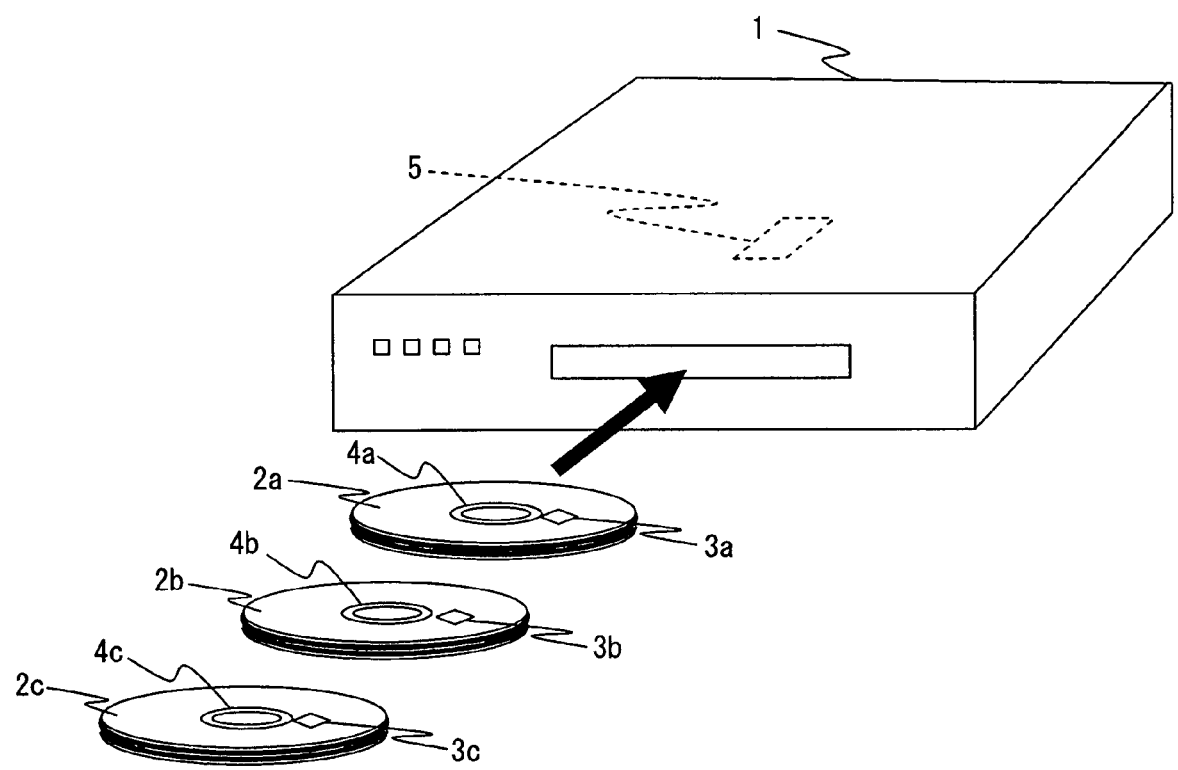
FIG. 6 is an external view of an optical disc having an RFID tag and an optical disc apparatus having a reader for RFID tags according to a third embodiment of the present invention.

Referring now to FIG. 6, description is made as to an optical disc 2 having an RFID tag 3 and an optical disc apparatus 1 according to a third embodiment of the present invention. The third embodiment corresponds mainly to claims 15, 18, and 19. As shown in FIG. 6, a plurality of optical discs 2a, 2b, and 2c have RFID tags 3a, 3b, and 3c and antennas 4a, 4b, and 4c, respectively. Stored in the RFID tags 3a and 3b is key information needed for reproduction of an additional content (bonus content in this example) other than contents capable of being reproduced by an optical disc apparatus that is not equipped with an RFID tag reader. When a user inserts the optical discs 2a and 2b containing the respective pieces of key information, which are different from each other, in the optical disc apparatus 1, the microprocessor 10 of the optical disc apparatus 1 controls the reader 5 so that the pieces of key information are read out from the respective RFID tags 3a and 3b of the optical disc 2a and 2b. Then, the microprocessor 10 combines the read pieces of key information to obtain a new piece of key information. When a user inserts, in the optical disc apparatus 1, the optical disc 2c where the bonus content is recorded after the new piece of key information is obtained, the microprocessor 10 allows reproduction of the bonus content recorded in the optical disc 2c. As a result, all of the contents, including the bonus content, in the optical disc 2c can be reproduced. On the other hand, if a user inserts, into the optical disc apparatus 1, the optical disc 2c where the bonus content is recorded before the new piece of key information is obtained, the microprocessor 10 does not allow reproduction of the bonus content recorded in the optical disc 2c, so that only basic contents (contents other than the bonus content) of the contents recorded in the optical disc 2c can be reproduced. Accordingly, only a user owning all of the optical discs 2a, 2b, and 2c is allowed to view or listen to the bonus content recorded in the optical disc 2c. It is to be noted that the optical disc 2c has the RFID tag 3c in the example shown in FIG. 6 but the optical disc 2c does not necessarily require the RFID tag 3c.

In an example, the optical discs 2a and 2b are audio CD singles each having the RFID tag 3. The manufacturer of the optical discs 2a and 2b stores in advance the respective pieces of key information in the RFID tags 3a and 3b of the optical discs 2a and 2b. When a user inserts into the optical disc apparatus 1 the optical disc 2c where the bonus content is recorded, the microprocessor 10 of the optical disc apparatus 1 reads the two pieces of key information having been extracted from the optical discs 2a and 2b, which are singles, and combines the two pieces of key information to generate a new piece of key information. Based on the new piece of key information, the microprocessor 10 allows reproduction of a particular music content (for example, a content on the thirteenth track of a CD album) recorded on the optical disc 2c that is the third audio CD (for example, the CD album with an RFID tag). In this manner, the optical disc apparatus 1 with the RFID tag reader can offer the additional content as a bonus (bonus content) to a user while maintaining compatibility with an optical disc apparatus that is not equipped with an RFID tag reader. This feature can contribute to increase in demand for the optical disc apparatus 1 with the RFID tag reader.

The present invention has been described above using a presently preferred embodiment, but those skilled in the art will appreciate that various modifications are possible. Accordingly, all such modifications are intended to be included within the spirit and scope of the present invention.

For example, in the above embodiment, the RFID tag 3 and the antenna 4 are disposed on the surface of the clamping area 26 in the label surface 27, but they can be disposed on another desired area within the label surface. Alternatively, the RFID tag can be embedded in the substrate in the proximity of the label surface of the disc body. In this case, the RFID tag is protected by the substrate, so that it is hard to detach the tag. Accordingly, the RFID tag can be safely and reliably installed in the disc body. Further, the shape of the antenna for the RFID tag is not limited to a circle, but can be another shape such as a polygon or the like that is symmetric with respect to the center of the optical disc. Like the antenna for the RFID tag, the antenna in the RFID tag reader on the optical disc apparatus side can be formed in a circle, a polygon, or the like that is symmetric with respect to the center of the optical disc.

It is also possible to encrypt information stored in the RFID tag so as to make the copy protection more secure. Further, not only the disc control information but also another information for provision of additional services can be stored in the RFID tag.

In the third embodiment, it is described that the respective pieces of key information stored in the RFID tags 3a and 3b of the two optical discs 2a and 2b are used to generate a new piece of key information, based on which the bonus content recorded in the third optical disc 2c is allowed to be reproduced. However, the number of the optical discs containing the respective pieces of key information may be more than two. Further, in the embodiment, a single piece of key information is stored in each of the RFID tags, but two or more pieces of key information may be stored in each tag.

This application is based on Japanese patent application 2004-156705 filed May 26, 2004 and Japanese patent application 2004-164730 filed Jun. 2, 2004, the contents of which are hereby incorporated by reference.

What is claimed is:

1. An optical disc apparatus comprising:
an optical pickup that reads contents recorded in a disc body of a first optical disc;
a reader that reads key information stored in an RFID tag disposed on a disc body of a second optical disc;
reproduction means for reproducing the contents read by the optical pickup; and
a microprocessor that determines whether or not to allow reproduction of an additional content other than contents that are capable of being reproduced by an optical disc apparatus not having the reader, based on the key information read by the reader from the RFID tag on the second optical disc;
wherein a plurality of RFID tags are used to store the key information; and
wherein the microprocessor generates new key information based on the key information read from the plurality of RFID tags, and determines whether or not to allow reproduction of the additional content based on the new key information.

* * * * *